US005097857A

United States Patent [19]

Mayhew

[11] Patent Number: 5,097,857
[45] Date of Patent: Mar. 24, 1992

[54] ELECTRO-HYDRAULIC VALVE-ACTUATOR SYSTEM

[76] Inventor: John Mayhew, 6831 Campbell Dr., Salem, Va. 24153

[21] Appl. No.: 739,516
[22] Filed: Aug. 2, 1991
[51] Int. Cl.⁵ .......... F16K 31/122
[52] U.S. Cl. .......... 137/1; 137/624.12; 137/569; 60/394
[58] Field of Search .......... 137/624.11, 624.12, 137/565, 569, 1, 2; 60/394

[56] References Cited

U.S. PATENT DOCUMENTS

| | | | |
|---|---|---|---|
| 3,195,879 | 7/1965 | Bond | 60/394 X |
| 3,475,000 | 10/1969 | Fry et al. | 251/30 |
| 3,553,965 | 1/1971 | Lathrop | 60/52 |
| 3,630,025 | 12/1971 | Henry | 60/394 |
| 4,268,007 | 5/1981 | Chittenden | 251/30 |
| 4,744,542 | 5/1988 | Heusser | 251/30.01 |

*Primary Examiner*—Alan Cohan
*Attorney, Agent, or Firm*—Griffin, Branigan & Butler

[57] ABSTRACT

An electro-hydraulic valve-actuator system (30) includes an electric motor (58) for driving a hydraulic pump (60), with an electrical control circuit (68) energizing the electric motor to thereby furnish hydraulic fluid to a valve actuator (16). A timer (90, 92) times activation of the electric motor and extinguishes such activation at expiration of a time period required to approximately move a valve (22) to a desired position. A four-way electric solenoid valve (66) is coupled to the electrical control circuit for channeling pumped hydraulic fluid to either close or open the valve. An adjustable hydraulic bypass relief valve (76) is coupled to the hydraulic pump for establishing a hydraulic-fluid pressure provided by the pump. Individual electro-hydraulic valve-actuator systems of this invention can replace a pneumatic valve-actuator system, or electro-mechanical valve actuators.

10 Claims, 3 Drawing Sheets

ELECTRO-HYDRAULIC VALVE-ACTUATOR SYSTEM

BACKGROUND OF THE INVENTION

This invention relates broadly to the art of valve actuation, and more specifically to power valve actuation.

Large valves, such as knife gate valves used to control the flow of coal slurry, sewage, water, vacuums, chemicals, and the like, through large pipes, can often be difficult to operate. For this reason, it has been common practice to provide gate-blade actuators having manually-driven wheels for engaging gate blades via high-mechanical-advantage threaded shafts. However, as can be imagined, such activation of large valves is time consuming, labor intensive, strenuous, and requires a certain amount of strength. Thus, it is an object of this invention to provide a valve actuator which operates valves relatively quickly with expenditures of very little effort, requiring virtually no strength.

To overcome the above mentioned problems, a type of pneumatic valve actuators for knife-gate valves has been developed which basically comprises a cylinder with a piston therein having a piston shaft extending out an end of the cylinder where it is attached to a knife-gate valve. When it is desired to actuate the knife-gate valve, a pilot valve is moved to supply pressurized air to an appropriate end of the cylinder for driving the piston in the cylinder and thereby driving the knife-gate valve. Use of pressurized air has the benefit that exhausted air can be released from the cylinder to atmosphere so that a return air hose is not required. Also, with pressurized air one need not be unduly concerned about leaking fluid. Also, lower pressures are normally used than are used with hydraulic systems. However, use of pressurized air has the disadvantage that it requires greater diameter cylinders and pistons to achieve a required thrust than would a hydraulic system since lower pressures are normally used and air is compressible. Also, when pneumatic-valve actuation systems are used, it is usually more economical and convenient to have a centralized compressor and surge tank, with pneumatic hoses extending therefrom to various valve actuation devices. Such pneumatic hoses are often cumbersome and inconvenient and must be protected. Also, in cold weather air lines with water from condensation will freeze and the air lines will become stopped up with ice. This is common in the mining industry. Similarly, it is usually not economical or convenient to invest in such a pneumatic power system for a small number of valves. Thus, it is an object of this invention to provide a power valve-actuation system which does not use high pressures, does not require long, inconvenient hoses, and which is cost effective and convenient for use with a small number of valves.

It has been suggested to use hydraulic valve actuators for actuating knife-gate valves; however, this is seldom done. A problem with hydraulic valve actuators is that they normally operate at such high pressures, and with such great forces that they can cause damage when they are inadvertently closed on hard objects travelling in fluid lines. Also, extreme care in sizing actuators using high pressure hydraulic fluids is required because a thrust created could exceed design limitations of a valve being actuated. Also, most hydraulic systems are like air system with a central power supply system which runs continuously, which consumes energy, and produces heat (friction in hydraulic lines) that will shorten the life of the system.

Similarly, many power-driven valve actuators of this type often have limit switches which when a valve actuator is switched to close a valve, for example, deenergize the valve actuator once it is sensed that the valve is in a closed position. However, if the valve encounters a hard object and is thereby prevented from reaching a closed position, the limit switch never senses that the valve is closed and the valve actuator continues to try to drive the valve closed with high hydraulic pressure. Not only can such action cause damage to the valve, it can also damage the valve actuator by applying high pressures over long periods of time. Torque or pressure switches can be used to prevent this, however, such switches often malfunction. For this reason, it is an object of this invention to provide a valve-actuator system which when a valve being thereby driven encounters a hard object preventing the valve from closing nevertheless deactivates a valve actuator once it has been given a chance to close the valve. Similar problems can arise when one uses an electro-mechanical valve-actuator system for closing and opening a valve. It is therefore yet another object of this invention to provide a valve-actuator system which deactivates a valve actuator once it has been given an opportunity to move a valve to a desired position.

As mentioned above, some companies have installed pneumatic valve-actuator systems having central compressors and surge tanks supplying pressurized pneumatic fluid (air) to disbursed valve actuators via hoses. These companies have invested a great deal of money in these pneumatic systems and are therefore reluctant to switch to other power systems which might overcome some of the disadvantages of pneumatic power systems. Therefore, it is another object of this invention to provide a valve-actuator system, and a method of its installation such that it can be retrofitted to preexisting pneumatic valve systems with much of the equipment being retained and used in the newly installed power valve-actuator system.

It is also another object of this invention to provide a valve-actuator system and method of use thereof which is relatively inexpensive and convenient.

It is yet another object of this invention to provide a fail safe (fail open or fail closed) valve actuation in case of power failure.

SUMMARY OF THE INVENTIoN

According to principles of this invention, an electro-hydraulic valve-actuator system for motivating a valve actuator to close and open a valve includes an electric motor for driving a hydraulic pump, the electric motor including an electrical power supply for energizing the electric motor, with the hydraulic pump communicating with a valve actuator, the valve-actuator system including a switch for causing transmission of energy applied via the electric power supply, the electric motor, the hydraulic pump, and hydraulic fluid to the valve actuator, and the valve-actuator system including a timer for timing the application of such energy and at an expiration of a time period required to approximately move the valve to a desired position thereof, switching off the application of such energy.

A method of retrofitting an electro-hydraulic valve actuator system of this invention on a pneumatic valve actuator system involves using a separate electro-hydraulic valve-actuator system for each valve and energizing previously-existing pneumatic valve actuators with hydraulic fluid from the electro-hydraulic valve-actuator system.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENT

Figure 1:
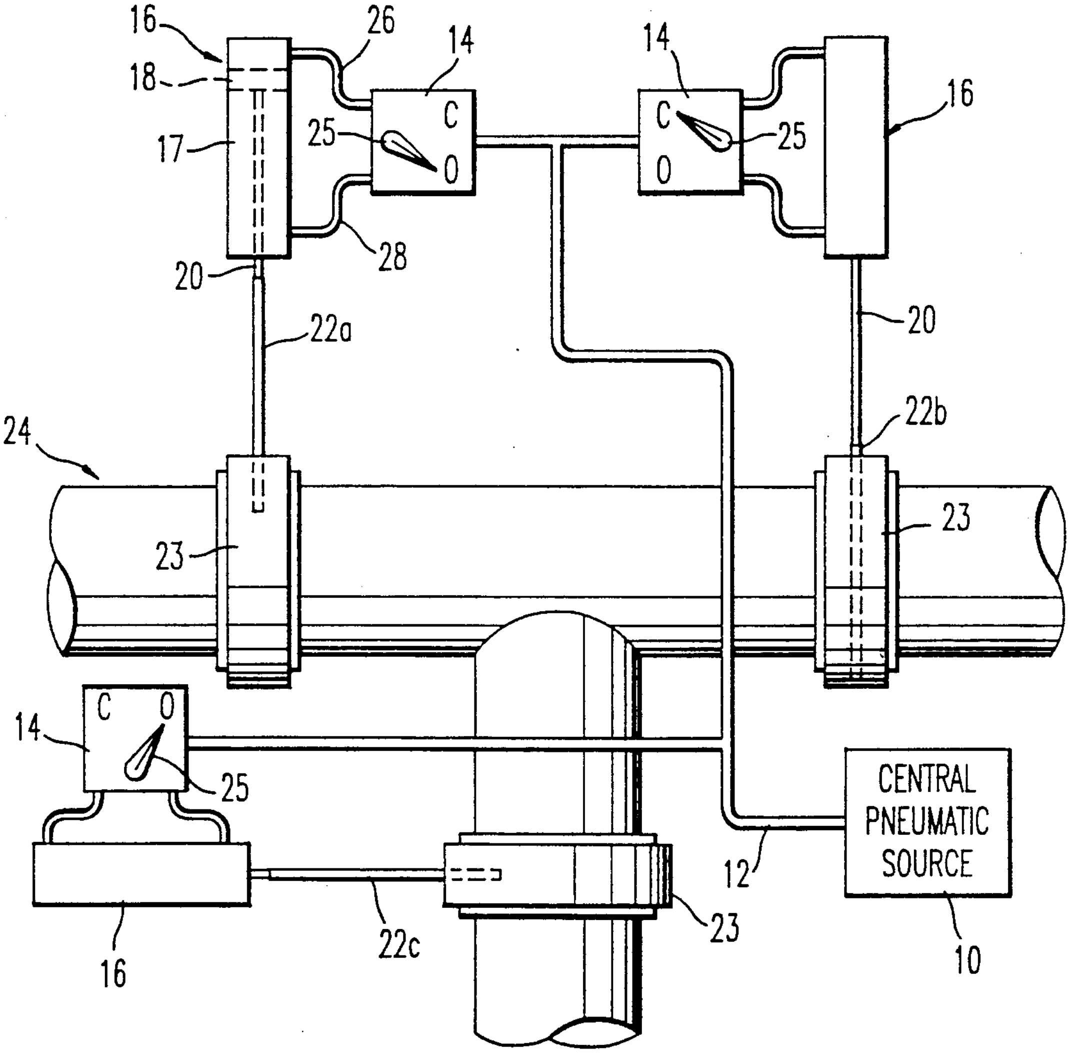
FIG. 1 PRIOR ART
FIG. 1 is a partially schematic, partially block diagram of a prior-art pneumatic valve-actuator system mounted on a pipe network for driving valve actuators and valves attached thereto.

FIG. 1 depicts a prior art pneumatic valve-actuator system which comprises a central pneumatic source 10, including a compressor (not shown in detail) and surge tank (not shown in detail) feeding pressurized air via pneumatic hoses 12 to pilot valves 14, each of which is attached to a pneumatic valve actuator 16. Each of the pneumatic valve actuators 16 includes a cylinder 17 having a piston 18 therein attached, via a piston rod 20, to an appropriate knife-gate valve 22*a–c* for moving in a valve seat assembly 23 the appropriate knife-gate valve 22*a–c* between a closed position in which it closes off fluid flow through a pipe system 24 and an open position in which it allows fluid flow through the pipe system 24. When it is desired to operate one of the knife-gate valves 22*a–c*, a lever 25 on the corresponding pilot valve 14 is moved to either a "closed" position or an "open" position. If the lever is moved to the "closed" position, pressurized air is applied to an auxiliary hose 26 into the cylinder 17 above the piston 18, an auxiliary hose 28 is exhausted to atmosphere, and the piston 18 is driven downwardly, thereby closing the appropriate knife-gate valve 22*a–c*. When the lever 25 is moved to the "open" position, this procedure is reversed with pressure being applied to the auxiliary hose 28 and the auxiliary hose 26 being exhausted to atmosphere. This system is beneficial in that only one main pneumatic hose 12 from the central pneumatic source 10 to the pneumatic actuator valve 14 is required. However, a difficulty with this prior-art system is that the pneumatic hoses 12 are cumbersome, expensive, and labor intensive to maintain.

Figure 2:
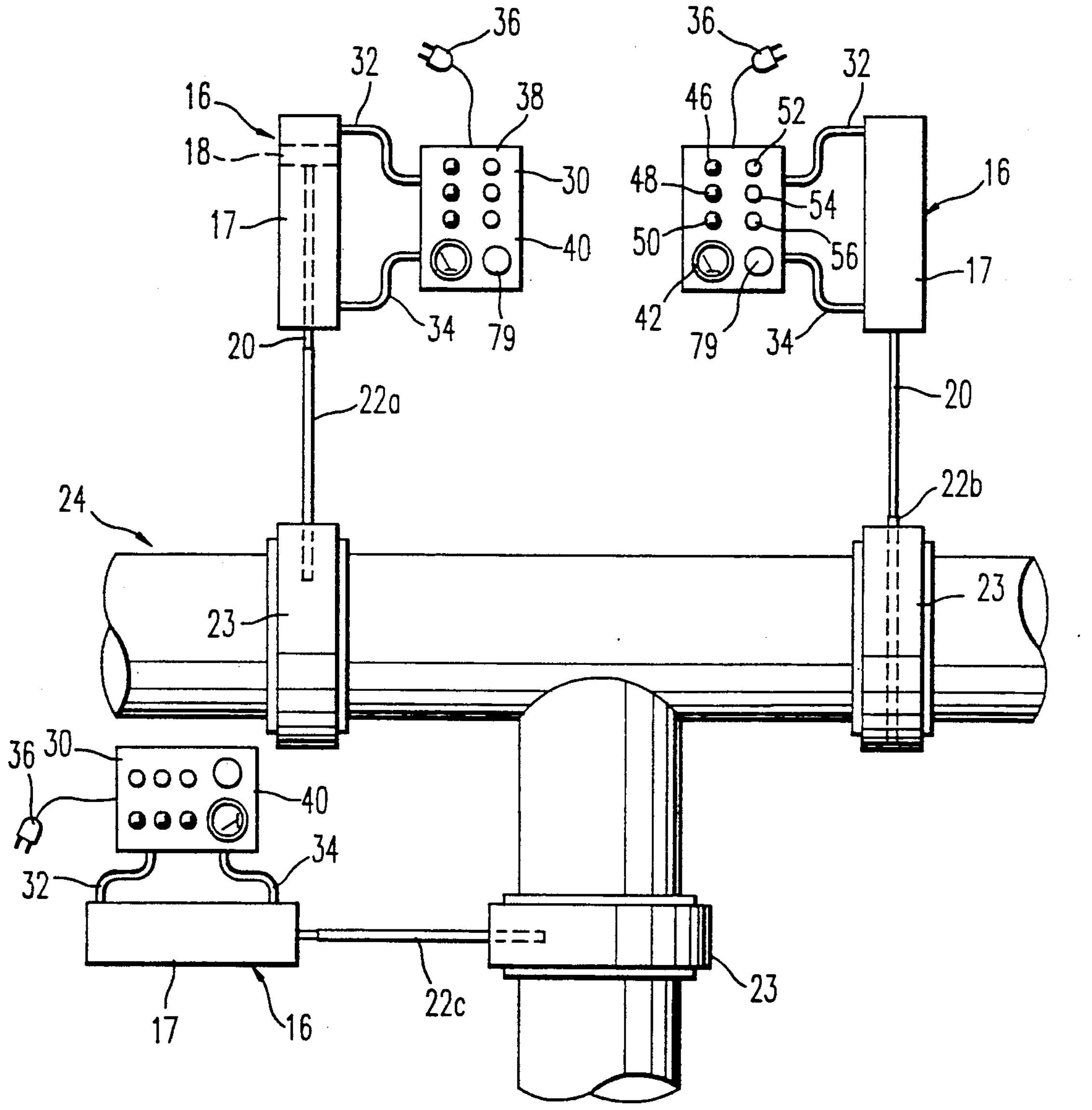
FIG. 2 is a view of the FIG. 1 system after it has been retrofitted with electro-hydraulic valve-actuator systems of this invention.

FIG. 2 depicts a similar valve-actuator system as is depicted in FIG. 1, which has been retrofitted to include electro-hydraulic valve-actuator systems of this invention. The pneumatic valve actuators 16, with their cylinders 17 and pistons 18, have been retained as have been the knife-gate valves 22 and their corresponding valve seat assemblies 23. However, the pilot valves 14, the central pneumatic source 10, and the hoses 12 have been replaced by valve-actuator systems 30 of this invention, one for each valve actuator 16. Each of these valve-actuator systems 30 includes closing and opening hydraulic hoses 32 and 34 which extends to opposite ends of a cylinder 17 of a pneumatic-valve actuator 16 in the same manner as did the auxiliary pneumatic hoses 26 and 28 in FIG. 1. It should be noted that in the FIG. 2 embodiment, a central supply hose, such as pneumatic supply hose 12 of FIG. 1, is no longer required to supply the individual valve-actuator systems 30. Instead, each of the valve-actuator systems 30 is self contained, being energized by 220 or 110 volt alternating electrical energy via a wall plug 36.

Figure 3:
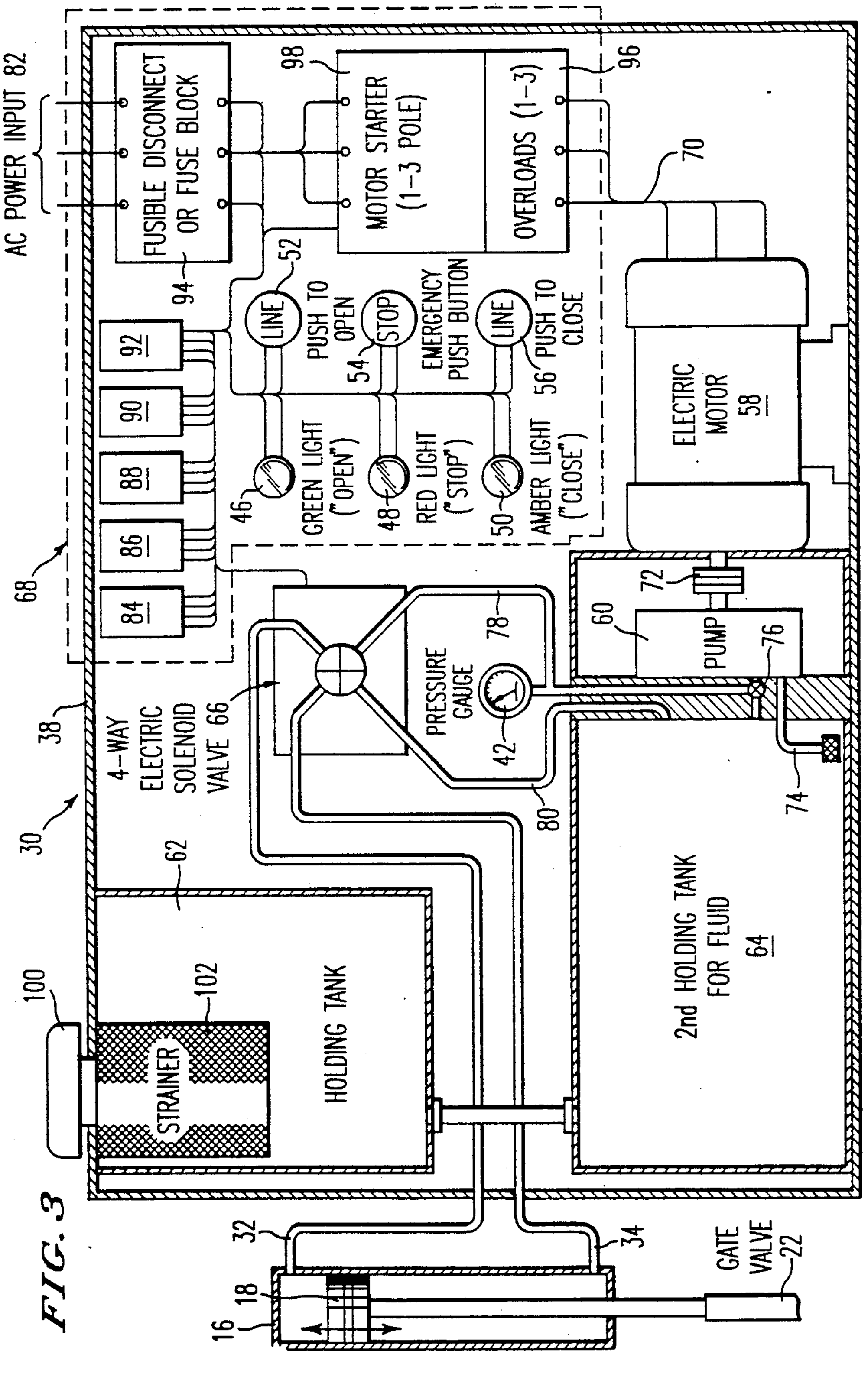
FIG. 3 is a partially schematic, partially block diagram of an electro-hydraulic valve-actuator system of this invention coupled to a valve-actuator which is, in turn, coupled to a gate valve.

Examining now one of the valve-actuator systems 30 in more detail (all of the valve-actuator systems 30 being identical) with reference to FIG. 3, main operating parts thereof are enclosed in a metallic housing 38 which is shown in FIG. 3 with a door 40 thereof being removed, the door being shown in FIG. 2 where each door 40 is shown closed. As can be seen in FIG. 2, each door 40 has holes therein so that a pressure gauge 42 and green, red and amber lights 46, 48, and 50 are visible from outside the housing 38, even when the door 40 is closed. Open, stop, and close push button switches 52, 54 and 56 can also be accessed when the door is closed by means of holes in the door. The manner in which these switches and lights are used during operation of the valve-actuator system 30 of this invention is described with a description of operation of the system below.

Basically, the electro-hydraulic valve-actuator system 30 comprises an electric motor 58, a pump 60 with associated first and second hydraulic fluid holding tanks 62 and 64, a four-way electric solenoid valve 66, and an electrical control circuit 68 coupled to the electric motor 58 and the four-way electric solenoid valve 66 for energizing and controlling operation of these two electrical members.

As can be seen in FIG. 3, the electric motor 58 is coupled to the pump 60 via a drive coupling 72 for directly driving the pump 60 when the electric motor 58 is energized on a line 70 by the electric control circuit 68. The pump 60, when operated, pumps hydraulic fluid from the second hydraulic-fluid holding tank 64 via a filtered pump-suction line 74 and a controllable bypass relief valve 76 to a pressure line 78. The pressure gauge 42 provides a reading of pressure applied to the pressure line 78 and the bypass relief valve 76 is controlled by a knob 79 (FIG. 2) extending through an opening in the metallic housing door 40 to set a particular pressure which will be present on the pressure line 78. In this respect, the pump 60 will be driven at a speed for providing a hydraulic pressure above that which is required to operate the piston 18 and the bypass relief valve 76 will then relieve whatever pressure is not required by bypassing hydraulic fluid to the second holding tank 64 to thereby maintain a desired pressure on the pressure line 78. In this respect, the hydraulic pump 60 can yield pressures up to 2,500 psi, however, normally the bypass relief valve will be operated to regulate a pressure of only between 50 to 250 psi on the pressure line 78.

The pressure line 78 is coupled to the four-way electric solenoid valve 66. The four-way electric solenoid valve 66 can be switched to apply hydraulic pressure in the pressure line 78 either to the closing hydraulic hose 32 coupled to side A of the pneumatic valve actuator 16 or to the opening hydraulic hose 34 which is coupled to side B of the pneumatic valve actuator 16. When the four-way solenoid valve 66 couples one of the closing or opening hydraulic hoses 32 or 34 to the pressure line 78, it automatically couples the other thereof to a return line 80, which allows fluid to flow back into the second holding tank 64.

Looking now more particularly at the electrical control circuit 68, this circuit receives three phase 220 volt AC alternating power from plug 36 (FIG. 2) at power lines 82, however, application of this power to the electric motor 58 and the four-way electric solenoid valve 66 is controlled by the open, stop, and close push button switches 52, 54 and 56 in conjunction with a memory relay driver 84, anticoincident relays 86 and 88, and closing and opening resettable timers 90 and 92. All of these circuits can be purchased off-the-shelf with the memory relay driver 84 being available from:

IDEC
Model #RH2LB-U-AC 120V
Specs. Latching relay, 10 AMP;

the anticoincident relays 86 and 88 being available from:

IDEC
Model #RH2B-U-AC 120V
Specs. Relay DPDT;

and the resettable timers 90 and 92 being available from:

Solid State Advanced Controls (SSAC)
Model #TDS 120 AL-D
Specs. SSAC Timer, 11-Pin.

The functions of each of these drivers, relays, and timers will be described with the description of the operation of the overall device below.

The electrical control circuit 68 further comprises circuit breakers, or fuses, at 94 and 96 for safety purposes, and a motor starter circuit at 98.

Describing now operation of a valve-actuator system 30 of this invention, the valve-actuator system 30 normally replaces the pilot valve 14, the central pneumatic source 10, and connecting hoses 12 of a pneumatic valve actuator system, however, it could also be installed as original equipment. There is no need to run a hydraulic or pneumatic hose 12 to the valve-actuator system 30 but rather, each unit is self contained with its power lines being coupled to 220 volts by plugging its plug 36 into a 220 voltage socket, or by simply hard wiring the power lines 82 to a 220 voltage circuit. The closing and opening hydraulic hoses 32 and 34 are attached to sides A and B of the pneumatic cylinder 17. Hydraulic fluid of a type often used in vehicle transmission systems is poured into the first holding tank 62 via an opening uncovered by a cap 100 and this hydraulic fluid, after passing through a strainer 102 and the holding tank 62 passes into the second holding tank 64. The bypass relief valve 76 is adjusted by means of the knob 79 extending outside the metallic housing 38 so that the hydraulic pump 60 will produce a desired pressure at the pressure line 78, which is usually around 75 psi. The closing and opening resettable timers 90 and 92 are set to measure time intervals required for the formely pneumatic, but now hydraulic, valve actuator 16 to respectively close and open the knife-gate valve 22 when operating at the pressure appearing on the pressure line 78 (75 psi, for example) as set by the bypass relief valve 76.

Assuming the knife-gate valve 22 is in an "open" position, which would mean that the piston 18 is near the top of the cylinder 15 of the pneumatic valve actuator 16, the green light 46 is held in a lighted configuration by the memory relay driver 84, which remembers the last operation and maintains the appropriate light in a lit state in accordance therewith, even after the motor 58 has been deenergized.

If an operator desires to close the knife-gate valve 22, he or she depresses the "close" push-button switch 56 and immediately the memory relay driver 84 records this, extinguishes the green light 46, and lights the amber close light 50 which it maintains lit until another push button is depressed. Simultaneously with the operator depressing the close push-button switch 56, and as a result thereof, the close anticoincident relay 86 is operated to provide power to the electric motor 58 and the four-way electric solenoid valve 66. Upon being actuated by the close anticoincident relay 86, the four-way electric solenoid valve 66 is moved to a position for communicating the pressure line 78 with the closing hydraulic hose 32 so that pressurized hydraulic fluid will operate on the top of the piston 18 and drive the knife-gate valve 22 downwardly toward a closed position. Also, because of operation of the close anticoincident relay 86 the electric motor 58 is energized on the electric line 70 and this energization is maintained due to operation of the closing resettable timer 90. During this energization the electric motor 58 is driven to drive the pump 60 and thereby create the desired pressure in the pressure line 78 for closing the gate valve 22. However, once the interval of time set on the closing resettable timer 90 expires, which interval is precalculated to be sufficient to fully close the knife-gate valve 22, the closing resettable timer 90 causes the electrical control circuit 68 to turn off power to the electric motor 58, thereby halting the motor and maintaining fluid in the pressure line 78 in a stabile state. This stabile hydraulic fluid pressure will lock the piston 18, and the attached knife-gate valve 22, in their positions at this point.

Should it then be desired to open the knife-gate valve 22, the open push-button switch 52 is depressed by an operator which causes the anticoincident relay 88 to energize the electric motor 58 for an interval of time measured by the opening resettable timer 92 and moves the four-way electric solenoid valve 66 to a position for communicating the opening hydraulic hose 34 with the pressure line 78 and the closing hydraulic hose 32 with the return line 80. Also, the green open light is again lit via the memory relay driver 84. Again, the interval of time set on the opening resettable timer 92 is set such that the knife-gate valve 22 will normally be fully open when energy to the electric motor 58 is terminated by the timer 92.

The anticoincident interlock relays 86 and 88 are interlocked so that they cannot be simultaneously operated, thus, the four-way electric solenoid valve 66 cannot be simultaneously energized to move to two different positions. If the closed anticoincident relay 86 is operated, the open anticoincident relay 88 cannot be active, and vice versa.

In this system the electric motor 58 is driven in the same direction both for closing the valve 22 and for opening the valve.

If when the knife-gate valve 22 is closed by the electro-hydraulic valve-actuator system 30 of this invention it encounters a problem, such as it strikes a hard obstruction, any pressure which would tend to build up in the pressure line 78 is relieved by the bypass relief valve 76 and the knife-gate valve is thereby stopped even though the electric motor 58 continues to operate. As is mentioned above, the bypass relief valve 76 can be set to provide a desired sensitivity, or pressure, such that the system can overcome softer obstructions, but not harder obstructions.

Some prior art actuators on the market use torque or force switches and/or limit switches to determine when valves have been closed. It is beneficial, however, that the electro-hydraulic valve-actuator system of this invention does not rely on torque switches and limit switches because torque or force switches can often fail and limit switches do not work unless a valve has reached a specific limit, which it can be prevented from doing by obstructions.

It should be appreciated that, with this valve-actuator system, thrust and/or torque can be increased or decreased by adjustment to the bypass relief valve 76.

It is beneficial that the closing and opening resettable timers 90 and 92 can be adjusted to measure various time intervals because in this manner the system can be adjusted to operate various-size valves at various speeds. In this respect, a time interval may be adjusted to vary according to a size of an actuator (cylinder and piston) being used.

It is beneficial that the pump 60 and the electric motor 58 are automatically deactivated after a time interval because in the case of a knife-gate valve impacting on an obstruction, the electric motor 58 is not continually energized, thereby causing a heat buildup and a waste of energy.

By having two separate timers for opening and closing the knife-gate valve, the closing and opening hydraulic hoses 32 and 34, or lines, can be equipped with separate flow control valves to control the speed of fluid for side A or side B of the cylinder. In other words, it may desirable to open a knife-gate valve at one speed and close it at a different speed, in which case, the timers will be set to measure different time intervals. It might be possible to use a single timer which functions differently during a closing mode than during an opening mode.

In one embodiment the time interval measured by the timers for opening or closing the valve is around 12 seconds. In this system the valve being opened and closed has about a 6 inch strike and a 4 inch actuator piston.

The closing and opening anticoincident relays 86 and 88 are electrically and/or mechanically interconnected to prevent simultaneous operations of solenoids and timers. The anticoincident relays are linked to operation of the electromechanical motor starter 98, and the motor 58 coupled thereto. The memory relay driver 84 can be a bi-directional (flip-flop) action relay which remembers the position of the four-way electric solenoid valve 66 and thereby drives the correct panel light circuit for the respective line. The panel lights follow actuation of their companion push buttons. That is, the green light 46 turns on (and other lights turn off) when the open push-button switch 52 is depressed and remains on until another button is depressed. Similarly, the amber light 50 turns on (and other lights turn off) when the close push-button 56 is depressed, and the red light 48 turns on when the stop push-button switch 54 is depressed. In this respect, the emergency stop push-button 54 kills all control circuits and deenergizes the electric motor 58, thereby stopping all circuit operation, including electrical, electronic, and hydraulic circuits. Only one light at a time can be lit.

It is beneficial that the electro-hydraulic valve actuator system of this invention operates with such low pressure (50 to 250 psi) to actuate linear and rotary actuated valves. Similarly, it is beneficial that the electro-hydraulic valve actuator system of this invention is self contained with complete electronic controls for remote and local operation including a totally self-contained unit with electric motor, starter, hydraulic pump with reservoirs, control valves, and electronic controls. Similarly, it is beneficial that the electro-hydraulic valve system of this invention provides variable thrust and/or torque, thereby enabling an perator to vary the sensitivity and speed of operation.

By operating at such low pressures for a hydraulic system, the electro-hydraulic valve-actuator system of this invention can be used with pneumatic operated valve actuators when the seals of the air actuators are suitable for use with automotive transmission fluid, such as BUNA which is commonly used in air actuators. Further, with this system, smaller hydraulic actuators can be used for larger valves because of increased pressure available from hydraulic lines rather than normal air lines. With this system, the electric motor runs only when power is needed to actuate a valve and it is not required that a surge tank be maintained in a pressurized state.

With this system, once an operator pushes a control button for actuation, the actuator system will automatically cycle for a fixed time period to perform a desired function and then shut itself off.

The electro-hydraulic valve-actuator system of this invention is particularly suitable in locations where no air pressure is available but yet there is a need for valve automation.

It is noted that should the stop button be depressed when the knife-gate valve 22 is half closed, and then either the open push-button switch 52 or the close push-button switch 56 be depressed, the knife-gate valve 22 will then move to an extremity, either opened or closed, at which point the bypass relief valve 76 will relieve pressure in the pressure line 78, while the pump 60 continues to be energized for its normal opening or closing time period, as the case may be. Eventually, the appropriate timer 90 or 92 will turn off the electric motor 58.

While the invention has been particularly shown and described with reference to a preferred embodiment, it will be understood by those skilled in the art that various changes in form and detail may be made therein without departing from the spirit and scope of the invention. In one embodiment various parts used with the valve actuator system are identified as follows:

| | Manufacturer | Model # | Important Specs. |
|---|---|---|---|
| External Bypass Relief Valve 76 | Fenner | None | 50-250 psi; will actually go up to 1500 psi but that would stall motor out; up to 6 gallon min. |
| Electric Motor 58 | Reliance Electric | | 3450 RPM; 1 Horsepower; 110/220 volt; 60 Hz; |

-continued

| | Manufacturer | Model # | Important Specs. |
|---|---|---|---|
| Pump 60 | Fenner | | 1 phase. .488 cu. inch/rev.; positive cubic displacement pump; 7 gal/min. w/o pressure; with 175 psi, 3.5 gal/min. |
| Four-way electric solenoid valve 56 | Dayton Mfg. | 2A126 | 120 volt; 3/8 inch port. |
| Fuse block 94 | Buchanan | 525 | 300 volt |
| Motor starter 98 | G.E. | CR7CA10 | I.C. |
| Overloads 96 | G.E. | CR7G1WM | I.C. |

The elements used will vary on application. In one embodiment, for example, a 600 volt Allen Bradley fuse block is used. The four-way electric solenoid valve 56 can have a manual override and the overloads 96 can be manually reset. The motor starter 98 can include the overloads 96. The bypass relief valve could be internal to the pump.

In a fail safe system an expandable vessel, such as rubber bladder, diaphragm or piston seal with nitrogen gas therein, is placed in the hydraulic fluid of the holding tank 64. When the pump is working the pressurized hydraulic fluid compresses the nitrogen gas. The four-way electric solenoid valve 66 goes to a default position, upon a power failure the compressed nitrogen gas expands its vessel causing hydraulic fluid to go to the desired side of the actuator to open or close the valve even without pump action. The volume of hydraulic fluid available to do work depends upon the sizes of the various elements, the pressure (PSI, pressure per square inch) available and volume of the nitrogen gas that is being compressed by the fluid.

The embodiments of the invention in which an exclusive property or privilege are claimed or defined are as follows:

1. Electro-hydraulic valve-actuator system for motivating a valve actuator to close and open a valve, said system comprising:

a hydraulic pump means, including a hydraulic fluid holding tank thereof, for pumping hydraulic fluid from said holding tank to a pressure line;

an electric motor means for driving said hydraulic pump means;

an electrical power supply means for energizing said electric motor means;

a communication means for communicating pressure in said pressure line to a hydraulic valve actuator for closing and opening said valve;

wherein, said valve-actuator system includes an actuation switch means for causing transmission of energy applied via said electric motor means to said hydraulic pump means to said pressure line to thereby move said valve upon actuation thereof and a timing means for timing such transmission and extinguishing such transmission at an expiration of a time period required to approximately move said valve to a desired position thereof.

2. Electro-hydraulic valve-actuator system as in claim 1 wherein said communication means includes a multi-way electronic solenoid valve coupled to said pressure line for being switched to channel said hydraulic fluid either to a closing inlet of said hydraulic valve actuator or to an opening inlet of said hydraulic valve actuator.

3. Electro-hydraulic valve-actuator system as in claim 1 wherein said hydraulic pump means includes an adjustable pressure relief valve for adjusting a maximum hydraulic-fluid pressure at said pressure line.

4. Electro-hydraulic valve-actuator system as in claim 3 wherein said communication means includes a multi-way electronic solenoid valve coupled to said pressure line for being switched to channel said hydraulic fluid either to a closing inlet of said hydraulic valve actuator or to an opening inlet of said hydraulic valve actuator.

5. Electro-hydraulic valve-actuator system as in claim 4 wherein said electric power supply means switches said multi-way valve means when it energizes said electric motor.

6. Electro-hydraulic valve-actuator system as in claim 5 wherein said electric power supply means includes an emergency stop switch for extinguishing all further energy transmission.

7. A method of energizing a valve-actuator to open and close a valve comprising the steps of:

extending hydraulic hoses from a hydraulic pump to said valve actuator, said pump having a bypass relief valve for regulating a hydraulic pressure provided to said hydraulic hoses by said pump;

driving said pump with an electric motor;

energizing said electric motor with electrical energy controlled by a timer which turns said motor off at the end of a predetermined time which is set to allow sufficient time for the valve actuator to move said valve to a desired position at the pressure established by the bypass relief valve.

8. A method as in claim 7 wherein is included the step of coupling said pump to said valve actuator via a multi-way valve which is automatically moved by electrical energy to an appropriate position for either closing or opening the valve when the electric motor is energized.

9. A method as in claim 8 wherein is further included the step of automatically lighting a light and maintaining said light lit as an indication of the position of said multi-way valve when the electric motor is energized.

10. A method as in claim 7 wherein said valve actuator includes a pneumatic cylinder.

* * * * *